(12) United States Patent
Venton-Walters et al.

(10) Patent No.: US 7,108,253 B2
(45) Date of Patent: Sep. 19, 2006

(54) MOUNTING ASSEMBLY

(75) Inventors: Roy Venton-Walters, Neshkoro, WI (US); Jesse Knoble, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 2 days.

(21) Appl. No.: 10/933,809

(22) Filed: Sep. 3, 2004

(65) Prior Publication Data
US 2006/0049562 A1    Mar. 9, 2006

(51) Int. Cl.
*B60G 15/00*    (2006.01)

(52) U.S. Cl. ............... 267/220; 267/294; 267/140; 280/124.14

(58) Field of Classification Search ........... 188/321.11, 188/322.12; 267/292, 293, 294, 139, 140, 267/141, 219, 220, 140.2; 280/124.147, 280/124.155; 403/225, 226, 227
See application file for complete search history.

(56) References Cited

U.S. PATENT DOCUMENTS

| | | | |
|---|---|---|---|
| 2,749,114 | A | 6/1956 | Withall |
| 3,145,985 | A * | 8/1964 | Bourcier ............. 267/64.16 |
| 3,263,983 | A | 8/1966 | Bliven |
| 4,211,429 | A | 7/1980 | Howard |
| 4,445,674 | A | 5/1984 | Clayton, Jr. |
| 5,456,454 | A | 10/1995 | Schulz et al. |
| 5,641,152 | A | 6/1997 | Angles et al. |
| 6,076,794 | A | 6/2000 | Pradel |
| 2003/0178269 | A1 | 9/2003 | Hayashi et al. |
| 2005/0133322 | A1 * | 6/2005 | Huprikar et al. ...... 188/321.11 |

FOREIGN PATENT DOCUMENTS

| | | |
|---|---|---|
| DE | 41 19 701 A1 | 12/1992 |
| DE | 42 39 889 A1 | 6/1994 |
| DE | 102 00 608 A1 | 8/2002 |
| EP | 0 738 839 A1 | 10/1996 |
| EP | 1 122 102 A2 | 8/2001 |
| FR | 2 335 747 | 7/1977 |
| GB | 1 037 760 | 8/1966 |
| JP | 10-132013 | 5/1998 |
| JP | 11-013825 | 1/1999 |
| JP | 2000186738 | 7/2000 |

OTHER PUBLICATIONS

International Search Report dated Feb. 16, 2006, International Application No. PCT/US2005/031381.

* cited by examiner

*Primary Examiner*—Thomas Williams
(74) *Attorney, Agent, or Firm*—Foley & Lardner LLP (57) ABSTRACT

A mounting apparatus for use within a suspension system having a frame member, a control arm, and an elongated suspension member extending between the frame member and the control arm is disclosed. The mounting apparatus includes a cup, a seal, a resilient element, and a fastener. The cup includes an end that is at least partially closed, a side wall, and an open end. The seal is disposed within the cup and is configured to be coupled to the elongated suspension member. The resilient element is at least partially disposed within the cup and is substantially encapsulated by the cup and the seal. The fastener is configured to couple the cup, the seal, and the resilient element between the elongated suspension member and one of the frame member and the control arm.

55 Claims, 3 Drawing Sheets

MOUNTING ASSEMBLY

BACKGROUND OF THE INVENTION

The present invention relates generally to the field of suspension systems for vehicles. More particularly, the present invention relates to a mounting apparatus for use in the suspension systems of vehicles.

Suspension systems making use of elastomeric members or bushings between a generally fixed portion of the frame of the vehicle and an end of a shock absorber, strut, or other type of cylinder or suspension member (hereinafter collectively referred to as a cylinder) are generally well-known within the art. These elastomeric members are generally used to reduce transmitted road noise and suspension vibration, and are also generally flexible enough to allow for articulation or movement of the cylinder during suspension travel. These systems may include such an elastomeric member on each side of the frame to provide dampening during both the compression and extension of the cylinder.

Generally speaking, the greater the loads to which the elastomeric members are subjected, the harder the elastomeric member needs to be to withstand those loads. However, as an elastomeric member gets harder, it tends to provide more resistance to the articulation or movement of the cylinder that takes place during suspension travel. This increased resistance provides a greater torque to the cylinder, which in turn, increases the wear on the cylinder and reduces its useful life.

The suspension systems of heavy-duty vehicles and machinery, such as concrete trucks, dump trucks, and other similar vehicles, must be designed to withstand significantly greater loads and forces than normal passenger cars. One type of suspension system used in many heavy-duty vehicles and machinery consists primarily of a spring, which supports the weight of the vehicle (often referred to as the sprung weight) and a separate shock of some type to limit or dampen the movement of the suspension system. In this type of suspension system, the shock, and therefore the elastomeric members or bushings used to couple the shock to the frame, are not subjected to the weight of the vehicle. Rather, the shock and elastomeric members are subjected only to the damping forces the shock exerts into the system during full jounce and rebound travel of the suspension system.

In another type of suspension system used in heavy-duty vehicles and machinery, the spring and the shock are combined into one unit, which may take the form of a hydraulic and/or pneumatic cylinder. In these systems, the cylinder is subjected to, and must support, the weight of the vehicle as well as the damping forces the cylinder exerts into the system during full jounce and rebound travel of the system. Accordingly, the elastomeric members or bushings used to couple the cylinder to the frame of the vehicle are generally subjected to more force in the jounce direction than they would otherwise be in a system where the spring and shock are separate. In order to withstand these greater forces and loads in the jounce direction, harder elastomeric members or bushings are generally used in the combined spring and shock systems than are used in the separate spring and shock systems. These harder elastomeric members or bushings in the combined spring and shock systems generally provide more resistance to the movement and articulation of the cylinder. Consequently, the cylinder generally wears faster and has a reduced life when compared to a shock in a system where the spring and shock are separate units.

In systems where the shock and the spring are separate, there are generally at least two elastomeric members. One is used to provide dampening during the jounce of the suspension system and the other is used to provide dampening during the rebound of the system. Because of the nature of a conventional shock absorber, which tends to resist movement in either direction, the jounce and rebound elastomeric members are generally subjected to forces that are similar in magnitude. In a suspension system having combined shock and spring units, the jounce elastomeric member is generally subjected to significantly greater forces than is the rebound elastomeric member due to the compounding of the damping forces and the vehicle weight. To account for the different loading conditions, elastomeric members having different properties may be used. However, when elastomeric members having different properties are used, they may expand and contract at different rates, which may cause undesirable gaps to occur between the various elements of the suspension system during its operation.

DETAILED DESCRIPTION OF THE EXEMPLARY EMBODIMENTS

Before providing the description of the exemplary and alternative embodiments of the mounting assemblies, it should be noted that references to "upper" and "lower" in this description are merely used to identify the various elements as they are oriented in the figures. These terms are not meant to limit the element which they describe, as the various elements may be oriented or arranged differently in various suspension systems.

For purposes of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
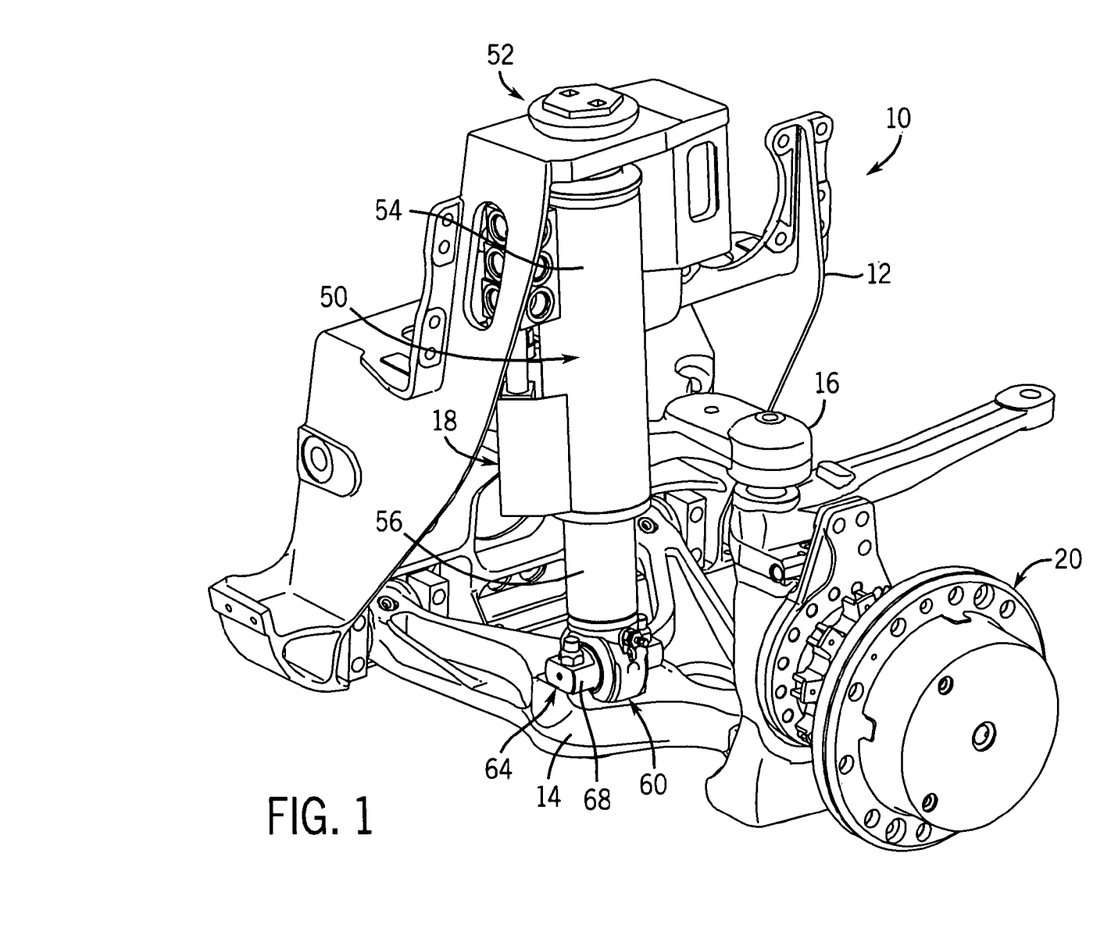
FIG. 1 is a perspective view of a suspension system according to one exemplary embodiment.

Referring to now FIG. 1, a suspension system 10 according to one exemplary embodiment includes a frame member 12, a lower control arm 14, an upper control arm 16, a cylinder assembly 18, and a wheel and brake assembly 20. Frame member 12 is the portion of the frame to which lower control arm 14, upper control arm 16, and cylinder assembly 18 are coupled. According to various exemplary and alternative embodiments, frame member 12 may take one of a variety of different shapes and/or sizes depending upon the characteristics of the vehicle to which suspension system 10 will be coupled and the configuration of suspension system 10. According to other various alternative embodiments, frame member 12 may be integrally formed as a single unitary body with another portion of the frame, or may be a separate structure or apparatus otherwise coupled to the frame.

Lower control arm 14 and upper control arm 16 are each coupled to a portion of frame member 12, with upper control arm 16 being located generally above and parallel to lower control arm 14. Lower control arm 14 and upper control arm 16 each have a first end that is pivotally coupled to a portion of frame member 12 and a distal end that is coupled to opposite sides of wheel and brake assembly 20. Lower control arm 14 and upper control arm 16 are coupled to frame member 12 and wheel assembly 20 in such a way that allows wheel assembly 20 to translate up and down in response to varying road conditions. Generally, lower control arm 14 and upper control arm 16 control, limit, or restrict, to a certain extent, the movement of wheel and brake assembly 20 relative to frame member 12.

Wheel and brake assembly 20 is coupled to lower and upper control arms 14 and 16 and generally includes certain components of the brake system of the vehicle as well as the structure to which the wheel is mounted. Wheel and brake assembly 20 generally transfers the movement of the tires of the vehicle to the other components of suspension system 10. According to various exemplary and alternative embodiments, the wheel and brake assembly may include one or more of a variety of different components and may take one of a variety of different configurations.

A suspension member (shown as cylinder assembly 18) extends between lower control arm 14 and frame member 12 and generally controls, limits, and/or dampens the movement of lower control arm 14 relative to frame member 12. Cylinder assembly 18 includes a cylinder 50, a joint 64, and a mounting apparatus 52.

Figure 2:
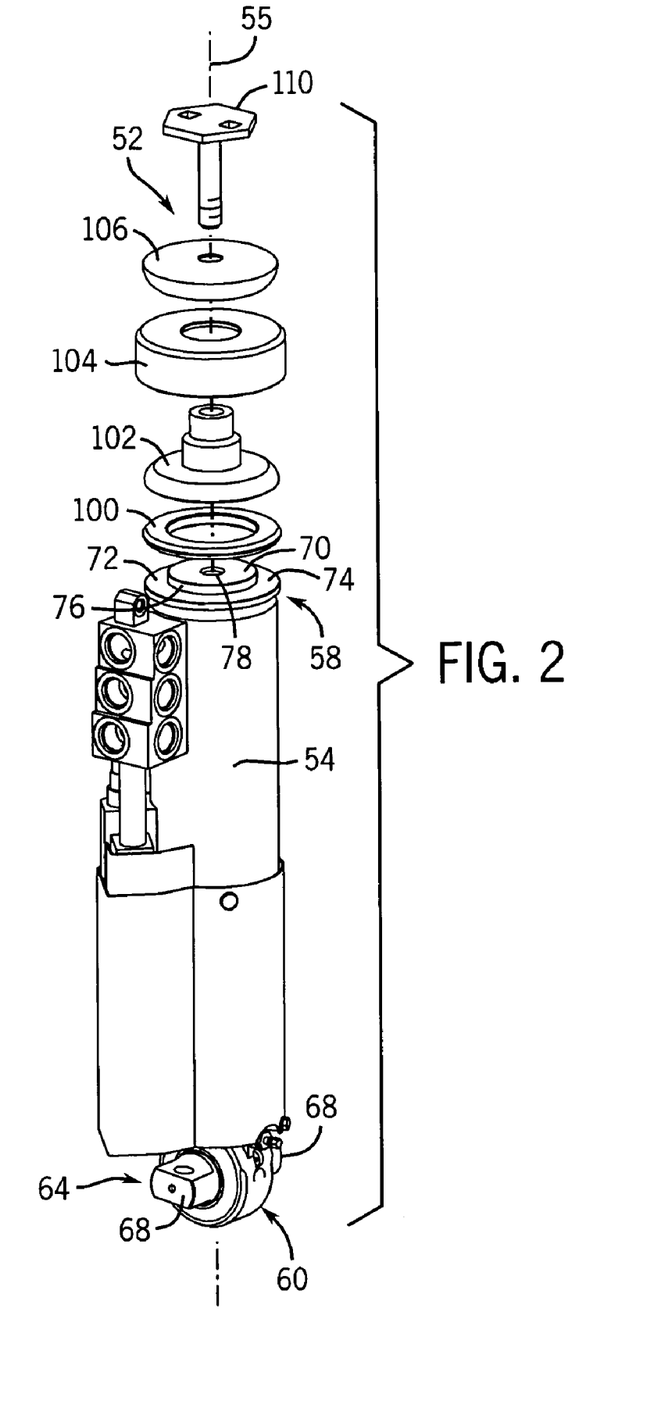
FIG. 2 is an exploded perspective view of the cylinder assembly of the suspension system of FIG. 1.
Figure 3:
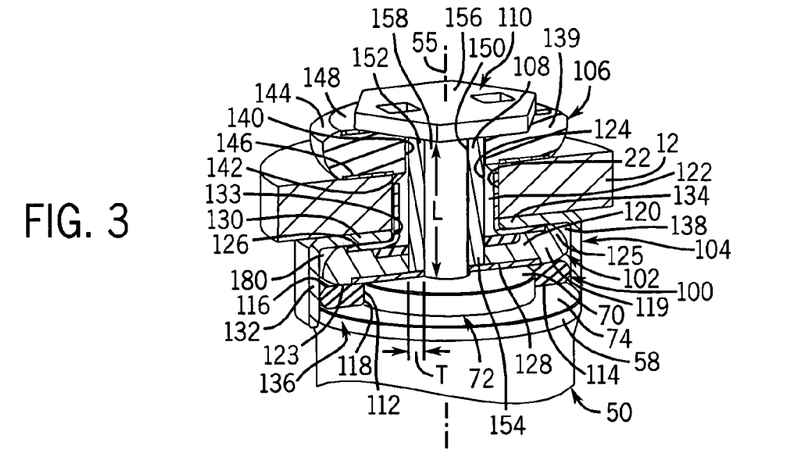
FIG. 3 is a cross-sectional view of a portion of the cylinder assembly of FIG. 1 in a first condition.

As best shown in FIGS. 1–3, cylinder 50 may be any one of a variety of different cylinders or suspension members, including those that are commercially available. For example, the cylinder may be a conventional shock absorber or strut or other type of hydraulic and/or pneumatic cylinder. According to one exemplary embodiment, cylinder 50 is a cylinder that has the characteristics of both a spring (similar to those used in conventional suspension systems) and a shock. One example of such a cylinder is a hydro-pneumatic spring that is modified to include a damping valve. Cylinder 50 includes a tube 54 and a piston rod 56 that share a longitudinal axis 55. The length of cylinder 50 changes as piston rod 56 moves into and out of tube 54 in response to the application of a force, such as a force exerted by hydraulic fluid within the cylinder 50 or a force exerted by an element coupled to cylinder 50. Cylinder 50 includes a tube end 58 that is coupled to frame member 12 and a rod end 60 that is coupled to lower control arm 14. Tube end 58 of cylinder 50 includes a generally circular and flat surface 70 that has a recess 72 that extends around the periphery of flat surface 70. Recess 72 forms an annular surface or shoulder 74 that is generally parallel to flat surface 70 and an inner surface 76 that is generally perpendicular to flat surface 70. Viewed another way, inner surface 76 and flat surface 70 form a generally cylindrical member that extends from the center of surface 74. Recess 72 is configured to receive a portion of mounting apparatus 52.

Referring now to FIG. 1, a connector or coupling member shown as joint 64 (e.g., bearing, spherical bearing, ball joint, coupler, mount, mounting joint, etc.) is coupled to rod end 60 of cylinder 50 and to lower control arm 14 and generally allows cylinder 50 to pivot or articulate relative to lower control arm 14 when suspension system 10 is in operation. According to one exemplary embodiment, joint 64 includes an outer race (not shown), an inner race (not shown) that is received within the outer race in a manner that allows the inner race to pivot or rotate relative to the outer race, and a pin 68 that extends through the inner race and that is coupled to lower control arm 14. Rod end 60 includes an aperture (not shown) into which joint 64 fits. One example of such a joint is disclosed in copending PCT Application Ser. No. PCT/US2004/028759, entitled "Joint" filed on Sep. 3, 2004 and listing Jesse Knoble and Eric Braun as inventors, which is hereby incorporated by reference in its entirety. According to various exemplary and alternative embodiments, a variety of different connectors or couplers may be used to connect the rod end of the cylinder to the lower control arm. For example, a variety of different types of ball joints or other types of joints or bearings may be used.

As best shown in FIGS. 2–5, mounting apparatus or assembly 52 is coupled to tube end 58 of cylinder 50 and to frame member 12. Mounting apparatus 52 includes a seal 100, a lower isolator 102, a cup 104, and upper isolator 106, and a fastener 110.

Seal 100 is a generally circular disk or annulus, having an aperture or opening 112 extending through its center, that is disposed proximate tube end 58 of cylinder 50. According to one exemplary embodiment, seal 100 includes a cylinder side or surface 114 (i.e., the surface of seal 100 that faces cylinder 50) and an isolator side or surface 116 (i.e., the surface of seal 100 that faces away from cylinder 50 or toward lower isolator 102). Aperture 112 has a diameter that is just large enough to allow seal 100 to rest within recess 72 of tube end 58 of cylinder 50. In this position, cylinder surface 114 of seal 100 generally rests against surface 74 of recess 72, isolator surface 116 of seal 100 is generally flush with flat surface 70 of cylinder 50, and an edge 118 of aperture 112 is disposed proximate inner surface 76 of recess 72. Seal 100 is aligned generally concentrically with tube 54 and is configured to substantially fill recess 72. To engage cup 104, seal 100 has a diameter that is slightly larger than that of tube 54.

According to one exemplary embodiment, seal 100 is reversible or symmetrical such that either of its two primary surfaces may serve as cylinder surface 114 or isolator surface 116. Thus, seal 100 may be coupled to cylinder 50 in either direction. According to an alternative embodiment, the seal may be configured such that it can be properly coupled to the cylinder in only one direction, with only one of the two primary surfaces of the seal serving as the cylinder surface and the other serving as the isolator surface.

According to another alternative embodiment, the tube end of the cylinder may not include a recess, but rather may be generally flat or have some other contour. The seal may then be configured to rest on the generally flat or otherwise contoured end of the cylinder and include an aperture that is large enough to receive a portion of the mounting apparatus (e.g., the fastener).

According to one exemplary embodiment, the seal is nylon, such as nylon 6 or a higher grade performance plastic. According to various other exemplary and alternative embodiments, the seal may be any one of a variety of different materials including polymers, elastomers, plastics, metals, alloys, and/or a variety of other suitable materials.

A generally resilient member or element shown as lower isolator 102 (e.g., jounce pad, compression pad, pad, cushion, stopper, bushing, biscuit, elastomeric member, etc.) includes a body portion 119, sleeve 108, and reinforcement members 126 and 128. Body portion 119 is aligned concentrically with cylinder 50 and seal 100. Body portion 119 is generally symmetrical around axis 55 and includes an aperture 124 extending through its center. In a cross-sectional view, each side of body portion 119 (one side being the mirror image of the other) is generally L-shaped, having a primary leg 120 that is oriented generally parallel to flat surface 70 of cylinder 50 and a secondary leg 122 that extends perpendicularly away from primary leg 120 toward frame 12. The distance that primary leg 120 and secondary leg 122 are spaced apart from axis 55 defines the radius of aperture 124. Primary leg 120 includes a lower surface or side 123 that rests upon flat surface 70 of cylinder 50 and/or isolator surface 116 of seal 100 as well as an upper surface or side 125 upon which cup 104 rests. Secondary leg 122 is generally configured to extend through cup 104 and frame 12 and to be received within upper isolator 106.

According to one alternative embodiment, the diameter of aperture 124 is constant along its length. According to another alternative embodiment, the diameter (and therefore the shape of the aperture) may vary along its length or may take a shape appropriate to receive the sleeve.

Sleeve 108 (e.g., spacer, tube, stop, etc.) is a generally rigid cylindrical member or tube that extends generally through aperture 124 of lower isolator 102 and that is intended to serve as a spacer and/or a support or type of reinforcement member. Sleeve 108 includes an aperture 150 that extends longitudinally through the center of sleeve 108 and that is configured to receive a portion of fastener 110. As part of lower isolator 124, sleeve 108 generally extends through, and is aligned concentrically with, aperture 140 in upper isolator 106, aperture 22 of frame member 12, and aperture 133 of cup 104. As illustrated in FIG. 3, the length L of sleeve 108 is such that when mounting apparatus 52 is in an appropriate preloaded condition, sleeve 108 extends through upper isolator 106 and is disposed proximate the underside of fastener 110, while a bottom 154 of sleeve 108 generally rests upon reinforcement member 128, which extends radially into aperture 124 of lower isolator 102 by a distance that is approximately equal to the thickness T of sleeve 108. According to an alternative embodiment, the sleeve may extend completely through the lower isolator and rest upon the flat surface on the end of the cylinder rather than on the reinforcement member of the lower isolator. According to another alternative embodiment, the sleeve may not make up part of the lower isolator but rather may be a separate piece or element. According to another alternative embodiment, the mounting apparatus may not include the sleeve, or the sleeve may be integrally-formed as part of another component of the mounting apparatus such as the fastener.

Reinforcement members 126 and 128 are recessed within body portion 119 of lower isolator 102 generally proximate the surface of body portion 119, and form a part of the periphery of lower isolator 102. Reinforcement members 126 and 128 provide additional structural support to body portion 119 in certain areas of lower isolator 102 and serve to distribute the loads applied to body portion 119. According to one exemplary embodiment, each of reinforcement members 126 and 128 are made from metal or an alloy. Accordingly to various alternative embodiments, the reinforcement members may be made from any one or more of a variety of suitable materials, including polymers, elastomers, ceramics, wood, etc., and may have one of a variety of different shapes, sizes, configurations, etc.

According to various alternative embodiments, the lower isolator may include a single reinforcing member or more than two reinforcing members. Moreover, each reinforcing member may be completely or partially embedded within or surrounded by the body portion, and may be positioned in a variety of locations on or within the lower isolator.

According to one exemplary embodiment, body portion 119 of lower isolator 102 is made from natural rubber, and lower isolator 102 is rated to withstand 15,000 pounds (prior to its encapsulation in cup 104). According to various alternative embodiments, the body portion of the lower isolator may be made from any one or more of a variety of different materials or compounds, including ethylene propylene diene monomer (EPDM) or other various polymers, elastomers, rubbers, and other resilient materials that are capable of returning to their unloaded shape after the application of a force or load, and the lower isolator may be rated to withstand forces greater than or less than 15,000 pounds (prior to being encapsulated in cup 104). The appropriateness of the material of the body portion and the load ratings of the lower isolator will depend upon the unique circumstances and characteristics of the particular application in which the mounting apparatus will be used, including the magnitude of the loads to which the lower isolator will be subjected. For example, a lower isolator that is appropriate for use in the mounting apparatus of a dump truck may be made from a different material or compound, have a different durometer or hardness, and have a different load rating than a lower isolator that is appropriate for use in the mounting apparatus of a garbage truck, tow truck, or a cement truck.

Suitable isolators are commercially available in a variety of different shapes, sizes, configurations, hardnesses (or durometers), and load ratings. Accordingly, one or more of a variety of different conventional or unconventional isolators may be used in the mounting apparatus. For example, according to one alternative embodiment, the lower isolator may not include the secondary leg, but rather may consist solely of the primary leg and have the general shape of an annulus, washer, or disk. According to another alternative embodiment, the secondary leg may extend only through the cup or only through the cup and the frame. According to another alternative embodiment, the isolator may not include any reinforcement members. According to still other alternative embodiments, the isolator may be such that it can be inserted into the mounting apparatus in only one orientation, or it may be such that it can be inserted into the mounting apparatus in more than one orientation.

Cup 104 (e.g., encapsulating member or element, bowl, skirt, cover, etc.) is a generally rigid member that includes an end wall 130 and a side wall 132 that are coupled together to form the general shape of an inverted cup. End wall 130 is generally circular and includes an aperture 133. End wall 130, including aperture 133, is aligned with the other elements of mounting apparatus 52 such that end wall 130 and aperture 133 are concentric with recess 72 of cylinder 50, seal 100, and lower isolator 102. Side wall 132 forms a hollow cylinder that extends perpendicularly from the perimeter of end wall 130. Together, end wall 130 and side wall 132 form a cylinder (e.g., cup) having a generally closed end 134, which faces and is disposed adjacent to frame member 12, and an open end 136, which faces cylinder 50.

Cup 104 generally encapsulates or encloses primary leg 120 of isolator 102 and seal 100. The size of aperture 133 of cup 104 is sufficient to allow secondary leg 122 of isolator 102 to extend therethrough, which allows end wall 130 to rest upon upper side 125 of isolator 102. With end wall 130 resting upon upper side 125 of isolator 102, side wall 132 extends toward cylinder 50 a distance sufficient to engage seal 100. In this configuration, cup 104 and seal 100 form a generally sealed chamber 138 in which primary leg 120 of lower isolator 102 is enclosed or encapsulated. The diameter of side wall 132 is slightly larger than the diameter of tube end 58 of cylinder 50 so that tube end 58 may at least partially enter into cup 104 through open end 136. At the same time, the diameter of side wall 132 is slightly smaller than, or slightly larger than, the diameter of seal 100 so that seal 100 may form a sufficient seal against the inside surface of side wall 132. According to one exemplary embodiment, the inner diameter of side wall 132 is approximately 0.25 inches greater than the outer diameter of tube end 58 of cylinder 50, while the tolerance or interference between seal 100 and side wall 132 is approximately 0±0.002 inches. According to various alternative embodiments, the relative dimensions, tolerances, and interferences between the seal, the cup, and the cylinder may vary.

According to a preferred embodiment, cup 104 is made from steel. According to various alternative embodiments, the cup may be made from one or more of a variety of suitable materials, including various metals, allows, polymers, elastomers, ceramics, etc.

A generally resilient member or element shown as upper isolator 106 (e.g., rebound pad, extension pad, pad, cushion, stopper, bushing, biscuit, elastomeric member, etc.) includes a body portion 139, a lower reinforcement member 146, and an upper reinforcement member 148. Upper isolator 106 is aligned concentrically with cylinder 50, seal 100, lower isolator 102, and cup 104. Body portion 139 is a generally circular disc or annulus that includes an aperture 140 extending through its center. Aperture 140 is configured to receive the portion of lower isolator 102 that extends beyond frame 12 and is generally aligned concentrically with aperture 133 of cup 104, aperture 112 of seal 100, aperture 22 of frame 12, and aperture 150 of lower isolator 102. Body portion 139 includes a frame side 142, which is generally disposed adjacent the side of frame member 12 that is opposite cup 104, and a fastener side 144, which is the side of isolator 106 that is opposite frame side 142 and generally disposed adjacent a portion of fastener 110.

Lower reinforcement member 146 and upper reinforcement member 148 are washer-like members that are recessed within frame side 142 and fastener side 144 of body portion 139, respectively, and generally form a part of the periphery of upper isolator 106. Reinforcement members 146 and 148 are substantially rigid and serve to provide additional structural support to body portion 139 as well as to distribute loads applied to body portion 139. According to one exemplary embodiment, each of reinforcement members 146 and 148 are made from metal or an alloy. Accordingly to various alternative embodiments, the reinforcement members may be made from any one or more of a variety of suitable materials, including polymers, elastomers, ceramics, wood, etc., and may have one of a variety of different shapes, sizes, configurations, etc.

According to various alternative embodiments, the upper isolator may include a single reinforcement member or more than two reinforcement members. Moreover, the reinforcement member may be completely or partially embedded within or surrounded by the body portion, and may be positioned in a variety of locations within or on the upper isolator.

According to one exemplary embodiment, body portion 139 of upper isolator 106 is made from natural rubber, and upper isolator 106 is rated to withstand 15,000 pounds. According to various alternative embodiments, the body portion of the upper isolator may be made from any one or more of a variety of different materials or compounds, including ethylene propylene diene monomer (EPDM) or other various polymers, elastomers, rubbers, and other resilient materials that are capable of returning to their unloaded shape after the application of a force or load, and the upper isolator may be rated to withstand forces greater than or less than 15,000 pounds. The appropriateness of the material of the body portion and the load ratings of the upper isolator will depend upon the unique circumstances and characteristics of the particular application in which the mounting apparatus will be used, including the magnitude of the loads to which the upper isolator will be subjected. For example, an upper isolator that is appropriate for use in the mounting apparatus of a dump truck may be made from a different material or compound, have a different durometer or hardness, and have a different load rating than an upper isolator that is appropriate for use in the mounting apparatus of a garbage truck, tow truck, or a cement truck.

Suitable isolators are commercially available in a variety of different shapes, sizes, configurations, and hardnesses (or durometer), and load ratings. Accordingly, one or more of a variety of different conventional or unconventional isolators may be used in the mounting apparatus. For example, according to one alternative embodiment, the upper isolator may include a secondary leg or extension that projects from the disk portion of the upper isolator. According to another alternative embodiment, the isolator may not include any reinforcement members. According to still other alternative embodiments, the isolator may be such that it can be inserted into the mounting apparatus in only one orientation, or it may be such that it can be inserted into the mounting apparatus in more than one orientation. According to other alternative embodiments, the upper and lower isolators may be interchangeable with one another.

Figure 4:
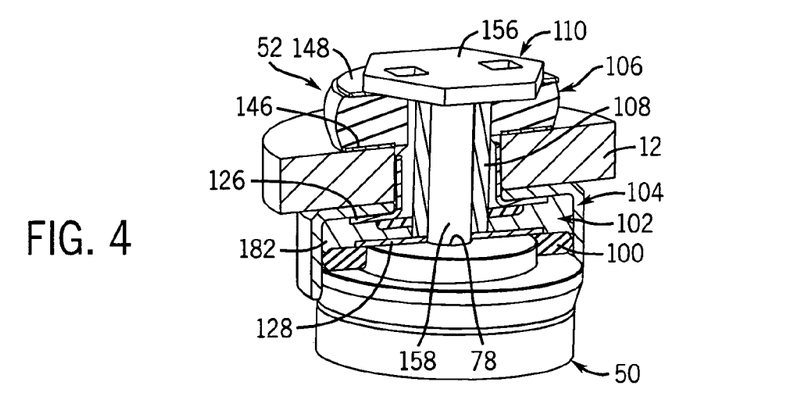
FIG. 4 is a cross-sectional view of a portion of the cylinder assembly of FIG. 1 in a second condition.
Figure 5:
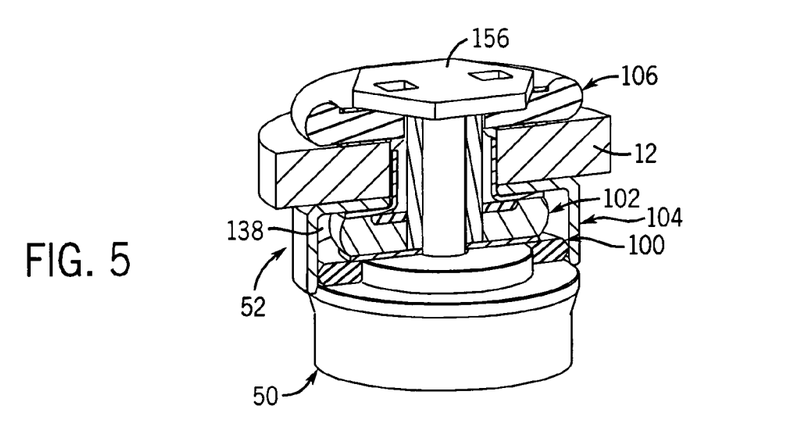
FIG. 5 is a cross-sectional view of a portion of the cylinder assembly of FIG. 1 in a third condition.

A retaining member or element (shown as fastener 110) couples to cylinder 50 to retain upper isolator 106, cup 104, lower isolator 102, and seal 100 in the appropriate positions relative to frame 12. Fastener 110 may include any one or more of a variety of suitable fastening or coupling devices or members, including, but not limited to, a bolt, a bolt-like member (as shown in FIGS. 3–5), a stud, a post, a nut, a washer, a snap ring, a pin, a protrusion extending from the cylinder, or any other suitable fastening devices or structures or combination of fastening devices or structures that generally retain the mounting apparatus in position relative to cylinder 50 and frame member 12. According to one exemplary embodiment, fastener 110 is a bolt-like member that includes a spanner nut that is coupled to a stud to form a head 156 and a shaft 158. Head 156 is a generally enlarged portion of fastener 110 that is larger than aperture 140 of upper isolator 106 (or aperture 22 of frame member 12 if there is no upper isolator) so as to retain upper isolator 106, lower isolator 102 (including sleeve 108), cup 104, and seal 100 between head 156 and cylinder 50 when fastener 110 is coupled to cylinder 50. Shaft 158 extends from head 156 and is configured to fit within aperture 150 of sleeve 108 of lower isolator 102. The distal end of shaft 158 generally includes threads that are received within a threaded bore 78 provided in flat surface 70 of cylinder 50.

According to various alternative embodiments, the fastener may be comprised of a protrusion, shaft, or stud that extends from the end of the cylinder through the mounting apparatus and that is configured to receive a nut and/or washer on its distal end (e.g., on the side of the upper isolator that is opposite the cylinder). For example, the mounting apparatus may be coupled to the piston rod of the cylinder rather than to the end of the cylinder tube, and the piston rod may be configured to serve as the fastener and extend through the mounting apparatus. According to other alternative embodiments, the fastener and sleeve may be combined into a single element that serves the function of both the sleeve and the fastener (e.g., the bolt may have a positive stop, shoulder or ledge incorporated therein, or the threads or bore depth may be configured so that the bolt may only be screwed into the cylinder a certain predetermined distance).

Referring back to FIG. 1, suspension system 10 is arranged such that the upward movement (commonly referred to as the jounce or compression) and downward movement (commonly referred to as the rebound or extension) of wheel assembly 20 in response to various road conditions causes lower control arm 14 to pivot toward and away from frame member 12. The movement of lower control arm 14 toward frame member 12 applies a force to cylinder 50, which causes cylinder 50 to retract. In the case where cylinder 50 serves as both the spring and the shock of suspension system 10, the movement of lower control arm 14 away from frame member 12 generally reduces the force applied to cylinder 50, which allows cylinder 50 to expand.

When cylinder assembly 18 is coupled to frame member 12, cylinder 50, seal 100, at least a portion of lower isolator 102, and cup 104 are located on the side of frame member 12 that faces lower and upper control arms 14 and 16. Upper isolator 106 and a portion of fastener 110 (e.g., head 156) are located on the opposite side of frame member 12. In this configuration, frame member 12 is positioned between upper isolator 106 and lower isolator 102; upper isolator 106 is positioned between head 156 of fastener 110 and frame member 12; and lower isolator 102 is positioned between cup 104, which rests against frame member 12, and cylinder 50. Accordingly, the resilient nature of upper isolator 106 and lower isolator 102 allows cylinder 50 to move toward frame member 12 (e.g., as a result of jounce or compression in suspension system 10, which tends to compress lower isolator 102 between cup 104, surface 70 of cylinder 50, and seal 100), to move away from frame member 12 (e.g., as a result of a full rebound or extension of suspension system 10 that may occur when the vehicle leaves the ground, which tends to compress upper isolator 106 between head 156 of fastener 110 and frame member 12), and to pivot or articulate relative to frame member 12. Thus, upper isolator 106 serves to dampen or reduce the loads caused by the movement of fastener 110 toward frame member 12 during the full rebound or extension of suspension system 10, while lower isolator 102 serves to at least partially dampen or reduce the loads caused by the movement of cylinder 50 toward frame member 12 during the jounce or compression of suspension system 10.

According to one exemplary embodiment of suspension assembly 10, cylinder 50 serves the function of both a shock absorber and a spring. Thus, cylinder 50 is designed and configured to both support most of the weight of the vehicle (e.g., the sprung weight) and to dampen the movement of lower control arm 14. Accordingly, when suspension system 10 is in a rest or equilibrium position illustrated in FIG. 3 (e.g., which occurs when vehicle is stationary and not subject to any outside forces), lower isolator 102 is compressed or sandwiched under the sprung weight of the vehicle (which does not include the weight of certain parts of suspension system 10, certain parts of the brake system, the wheels, etc.) between cup 104 and both cylinder 50 and seal 100. Depending on the type of vehicle in which suspension assembly 10 is incorporated, the compression forces acting upon lower isolator 102 when suspension system 10 is in a rest or equilibrium state, can be significant.

In addition to the compressive forces applied to lower isolator 102 by the sprung weight of the vehicle, forces resulting from the jounce or compression of suspension system 10 are also applied to lower isolator 102. These additional forces have the effect of increasing the total magnitude of the compressive forces applied to lower isolator 102. Depending on the characteristics of the object and/or the situation to which suspension system 10 is responding, these additional forces may also be quite large and may cause initial "shocks" or force "spikes." For example, in certain heavy-duty vehicles, such as cement trucks, dump trucks, garbage trucks, tow trucks, etc., the total compressive forces applied to lower isolator 102 may reach up to 45,000 pounds or more. It should be noted, however, that the total compressive forces acting on the lower isolator may vary depending on a number of factors, including the weight of the vehicle, the terrain encountered by the vehicle, and a variety of other factors. Thus, the total compressive forces acting on the lower isolator used in any particular vehicle or piece of machinery may be greater or less than 45,000 pounds.

As shown in FIG. 3, when suspension system 10 is in an equilibrium or rest state where it is supporting only the sprung weight of the vehicle, cylinder 50 and seal 100 extend partially into open end 136 of cup 104. In this state, sealed chamber 138 has an initial volume 180 that is greater than the volume of the portion of lower isolator 102 that is encapsulated by cup 104 (generally speaking, primary leg 120). When suspension system 10 is no longer in an equilibrium state and is subjected to jounce or compression forces other than the weight of the vehicle, these additional forces push cylinder 50 and seal 100 further into open end 136 of cup 104. The greater the magnitude of these additional forces, the further cylinder 50 and seal 100 are pushed into open end 136 of cup 104. The further cylinder 50 and seal 100 are pushed into cup 104, the more isolator 102 begins to compress and deform. Referring now to FIG. 4, as greater compressive forces are applied to isolator 102, the volume of chamber 138 continues to shrink, and isolator 102 continues to compress and deform to the general shape of cup 104, until the volume of chamber 138 (now represented by a volume 182) is equal to the volume of the portion of isolator 102 that is enclosed within cup 104. This point represents a point of hydraulic lock. Once isolator 102 reaches this point, additional forces can be applied to isolator 102 without any additional deformation (except as a result of the pivoting or articulation of cylinder 50), compression, tearing, or other damage occurring to isolator 102. Because seal 100 is a polymer or other at least partially compressible material (according to various exemplary embodiments), seal 100 may also compress and deform, to a certain extent, as the compressive forces increase. Generally, the deformation of seal 100 increases its diameter, which causes seal 100 to form a tighter seal against cup 104 as it is subjected to greater compressive forces. The manner and extent to which isolator 102 and/or seal 100 deform and compress may vary depending on the characteristics of the material from which isolator 102 and/or seal 100 are made. The configuration of cup 104, lower isolator 102, and the other components of mounting apparatus 52 allows the resistance of mounting apparatus 52 (e.g., the torque applied by mounting apparatus 52 to cylinder 50) to the pivoting or articulation of cylinder 50 to be minimally affected, even when the point of hydraulic lock is reached.

By encapsulating isolator 102 in the manner described above, isolator 102 may be able to withstand a force that is up to approximately three times greater than the force isolator 102 is rated to withstand (prior to encapsulation in cup 104). For example, an isolator that is rated to withstand 15,000 pounds in the absence of cup 104 may be able to withstand a compressive force of approximately 45,000 pounds when encapsulated within cup 104. One advantage of being able to use an isolator rated to withstand a smaller force than may actually be applied to the isolator in use is that a lower rated isolator generally applies less torque to cylinder 50 while it articulates or pivots during the operation of suspension system 10, which tends to increase the useful life of cylinder 50.

As suspension system 10 operates, lower control arm 14 generally pivots upwardly and downwardly about an axis in response to the movement of wheel assembly 20. Because one end of cylinder 50 is coupled to frame member 12, which is stationary, and the other end of cylinder 50 is coupled to a portion of lower control arm 14 that generally moves in a arc-shaped path around the pivot axis of lower control arm 14, cylinder 50 tends to not only expand and contract, but also to pivot or articulate relative to frame member 12. In other words, one end of the cylinder (the end coupled to the lower control arm) moves relative to the other end of the cylinder in such a way that not only results in a change in the length of cylinder 50, but also in a change in the orientation of axis 55 of cylinder 50 (e.g., a change in the angle of cylinder 50 relative to frame 12). Depending on the configuration of the various elements of suspension system 10, cylinder 50 may pivot or articulate up to approximately 5° (in any direction) relative to the equilibrium position of cylinder 50. More preferably, suspension system 10 is configured such that cylinder 50 pivots or articulates no more than 2°. Joint 64 generally allows cylinder 50 to pivot or articulate relative to lower control arm 14, while mounting apparatus 52 allows cylinder 50 to pivot or articulate relative to frame member 12. With respect to mounting apparatus 52, upper isolator 106 and lower isolator 102 deform as cylinder 50 pivots or articulates to account for the changing orientation of cylinder 50 and fastener 110 relative to frame member 12. For example, as cylinder 50 (or fastener 110) pivots or articulates in one direction, one side of cylinder 50 may move closer to frame member 12 while the opposite side of cylinder 50 moves away from frame member 12. An isolator that is made from a softer or lower durometer material provides less resistance (e.g., applies less torque) to cylinder 50 or fastener 110 as it pivots or articulates than does an isolator made from a harder or higher durometer material because the softer material is generally easier to deform. By reducing the amount of torque or resistance that is applied to cylinder 50 or fastener 110 by isolators 102 and 106, less torque is transferred to joint 64 of cylinder 50, to the seal between cylinder tube 54 and piston rod 56, and to the other components of cylinder 50. Reducing the torque applied to the components of cylinder 50 generally reduces wear and increases the life of cylinder 50. Cup 104 and seal 100, in combination with the other components of suspension system 10, make it possible for a relatively soft or low rated isolator to be able to withstand the compressive force that only a much harder and higher rated isolator would otherwise be able to withstand without, at the same time, significantly sacrificing the tendency of the softer isolator to provide less resistance to the pivoting or articulation of cylinder 50.

According to one exemplary embodiment of suspension system 10 where cylinder 50 serves the dual function of both the spring and the shock, upper isolator 106 is generally not subjected to the magnitude of forces to which lower isolator 102 is subjected and therefore does not have to be rated as high or be as hard as the lower isolator would have to be in the absence of cup 104 and seal 100. Unlike lower isolator 102, upper isolator 106 does not support the weight of the vehicle. When suspension system 10 is in the equilibrium or rest position, the only force that acts on upper isolator 106 is a preload force that is applied to upper isolator 106 by fastener 110 (discussed below), which is at least partially offset by the forces applied by cylinder 50 that tend to push tube end 58 of cylinder 50 toward frame member 12. In general, the only time upper isolator 106 will be subjected to any additional forces is when suspension system 10 is in the fully extended or rebound position and cylinder 50 is fully extended to the point where it serves as a hard stop for any further movement of suspension system 10 and no longer supports the weight of the vehicle. This situation may occur when the vehicle is high enough above the ground (e.g., airborne) to allow suspension system 10 to fully extend without the wheel of the vehicle touching the ground. Suspension system 10 may reach the fully extended position when the wheel of the vehicle passes over a dip or hole in the ground that is deep enough to prevent the wheel from maintaining contact with the ground or when the vehicle becomes airborne. At this point, the weight of certain portions of suspension system 10, as well as the weight of the tire, wheels, and brake assemblies (e.g., the unsprung weight) pulls downward on fastener 110, which in turn compresses upper isolator 106 between head 156 of fastener 110 and frame member 12. Furthermore, when the vehicle raises a sufficient distance, or the ground drops out from below the wheel, the force applied by cylinder 50 (which is no longer countered by the weight of the vehicle) causes cylinder 50 to extend until suspension system 10 and cylinder 50 reach their fully extended or maximum rebound position. Referring now to FIG. 5, when cylinder 50 extends to its fully extended position and stops, particularly if it stops abruptly, the momentum may tend to urge cylinder 50 away from frame member 12, which will in turn momentarily apply a compressive force (e.g., a force "spike" or "shock") to upper isolator 106. Upper isolator 106 helps to absorb or dampen at least a portion of the force "spike" or "shock" that is ultimately applied to frame member 12, and thereby helps to reduce any damage that would otherwise occur to frame member 12 by the sudden application of a force spike or shock. Although the magnitude of the compressive forces upper isolator 106 may be subjected to are not insignificant, particularly in heavy-duty vehicles, the total magnitude of these forces is generally less than the total magnitude of forces to which lower isolator 102 may be subjected. Accordingly, an isolator having a relatively low load rating, or an isolator that is relatively soft, may be used as upper isolator 106. Despite the fact that lower isolator 102 is subjected to greater compressive forces than upper isolator 106, the utilization of cup 104 and seal 100, in combination with the other components of mounting apparatus 52, generally makes it possible to utilize isolators for upper isolator 106 and lower isolator 102 that have the same or similar load ratings, or the same or similar hardnesses or durometers.

Referring still to FIG. 5, another advantage of being able to utilize a lower isolator 102 that has the same or similar load ratings as upper isolator 106 is that suspension system 10 can more easily be configured in such a way that when cylinder 50 moves away from frame member 12 and compresses upper isolator 106, lower isolator 102 expands to the same general extent that upper isolator 106 is compressed, and thereby helps to maintain the contact between cup 104, frame member 12, lower isolator 102, and cylinder 50.

Maintaining the contact between these components helps to reduce any shock or force spikes that may be applied to frame member 12 when cylinder 50 is once again moved toward frame member 12 (such as when an airborne vehicle lands on the ground again). The corresponding compression and expansion of upper isolator 106 and lower isolator 102, respectively, is generally made possible by preloading upper isolator 106 and lower isolator 102 to the appropriate extent. In the preload the condition, upper isolator 106 and lower isolator 102 are both subject to a certain compressive or preload force. As the total compressive force applied to upper isolator 106 is increased (such as when the vehicle leaves the ground) and head 156 of fastener 110 moves toward frame member 12, surface 70 of cylinder 50 will move away from frame member 12 by the same distance and the compressive force on lower isolator 102 will be decreased by the same amount, at least until lower isolator 102 is fully expanded. As long as the force on lower isolator 102 is not decreased by an amount that is greater than the preloaded compressive force on lower isolator 102, lower isolator 102 will continue to expand as the force applied to it is reduced. When upper isolator 106 and lower isolator 102 are the same or similar materials (and therefore have the same or similar spring coefficient), the distance that upper isolator 106 is compressed under the additional compressive forces will generally correspond to the distance lower isolator 102 will expand under the reduced compressive forces. Accordingly, using the same or similar materials for upper isolator 106 and lower isolator 102 helps to maintain the contact between cup 104, frame member 12, lower isolator 102, and cylinder 50 when cylinder 50 moves away from frame member 12.

As stated above, lower isolator 102 will generally be subjected to greater compressive forces (potentially much greater compressive forces) than will be upper isolator 106. Accordingly, for certain applications, it generally will not be practical to subject upper isolator 106 to the preload magnitude that would be needed to enable upper isolator 106 to maintain contact with both frame member 12 and head 156 of fastener 110 when lower isolator 102 is subjected to its maximum compressive force. To limit the movement of cylinder 50 toward frame member 12 as cylinder 50 applies a compressive force to lower isolator 102, and therefore the movement of head 156 of fastener 110 away from frame member 12, the volume of chamber 138 may be adjusted so that the point of hydraulic lock occurs when cylinder 50 moves toward frame member 12 by a certain distance X. Distance X is generally the distance that head 156 of fastener 110 can move away from frame member 12 without completely unloading the preload on upper isolator 106. Once the preload on upper isolator 106 is completely unloaded, upper isolator 106 will no longer expand and further movement of head 156 from frame member 12 will result in a gap between head 156 and upper isolator 106 and/or a gap between upper isolator 106 and frame member 12. The adjustment of the volume of chamber 138 to set the appropriate point at which hydraulic lock occurs helps to avoid the occurrence of such gaps. The volume into which lower isolator 102 is permitted to expand may be adjusted by adjusting the volume of chamber 138 and/or the volume of lower isolator 102 that is encapsulated within chamber 138, which may include adjusting the shape and/or size of cup 104 and/or of lower isolator 102. Once hydraulic lock occurs, any additional force applied by cylinder 50 will then be generally transferred directly to frame member 12 and will not cause cylinder 50 to move closer to frame member 12. Accordingly, the use of cup 104 and seal 100 to create a state of hydraulic lock facilitates the use of the same or similar materials for upper isolator 106 and lower isolator 102.

To assemble mounting apparatus 52, seal 100 is placed on cylinder 50 within recess 72. Lower isolator 102 is placed on seal 100 and surface 70 of cylinder 50 such that aperture 150 of lower isolator 102 is generally aligned with bore 78 in surface 70 of cylinder 50. Cup 104 is placed on lower isolator 102 such that secondary leg 122 extends through aperture 133 of cup 104 and cup 104 rests on primary leg 120. Cylinder 50, seal 100, lower isolator 102, and cup 104 are then placed proximate one side of frame member 12 such that secondary leg 122 of lower isolator 102 extends through aperture 22 of frame member 12. Upper isolator 106 is placed on the opposite side of frame 12 such that aperture 140 of upper isolator 106 generally receives the portion of lower isolator 102 that extends through frame 12. Shaft 158 of fastener 110 is inserted into aperture 150 of sleeve 108 and engages bore 78 of cylinder 50. In this configuration, head 156 of fastener 110 is positioned on one side of mounting apparatus 52 while cylinder 50 is positioned on the other side of mounting apparatus 52. Accordingly, tightening fastener 110 (e.g., moving head 156 of fastener 110 toward cylinder 50) beyond a certain point will apply a compressive force to both upper isolator 106 and lower isolator 102. As discussed above, subjecting isolators 102 and 106 to an initial compressive force or preload assists in maintaining the components of mounting apparatus 52 in the appropriate spatial relationship during the operation of suspension system 10. One can adjust the magnitude of the compressive force or preload applied to isolators 102 and 106 by varying the spacing between head 156 of fastener 110 and surface 70 of cylinder 50. According to one exemplary embodiment, sleeve 108 (either as part of lower isolator 102 or as a separate unit) extends between head 156 of fastener 110 and reinforcement member 123 of lower isolator 102 and is configured to limit the extent to which head 156 may approach surface 70. Thus, by selecting an appropriate length L for sleeve 108, one can essentially select or limit the maximum preload that will be applied to isolators 102 and 106 when fastener 110 is fully coupled to cylinder 50. According to other alternative and exemplary embodiments, the maximum preload may be selected or limited by adjusting the thickness of the frame in the area of the mounting apparatus. Assuming a constant length L, the thinner the frame is in the area of the mounting apparatus, the less preload will be applied to the upper and lower isolators. According to other exemplary and alternative embodiments both the length L of the sleeve and the thickness of the frame may be selected to achieve a desired preload.

According to various alternative embodiments, the mounting apparatus may be used in a variety of different suspension systems. According to other alternative embodiments, the mounting apparatus may be used in applications other than suspension systems, particularly in applications where two structures need to be coupled together, need to move relative to one another, and/or are subjected to forces that tend to urge the two structures closer together and/or away from one another. For example, the mounting apparatus described above may be adapted for use as a seismic mount in buildings in areas susceptible to earthquakes. According to still other alternative embodiments, the various elements and assemblies of the suspension system may be reversed. For example, the cylinder may be oriented such that the rod end of the cylinder is disposed proximate the frame member and the tube end is disposed proximate the lower control arm. Moreover, the tube end of the cylinder may be configured to receive the joint while the rod end may be configured to be coupled to the mounting apparatus. According to other alternative embodiments, the mounting apparatus may be used with a variety of different components of a variety of different suspension systems, and may be configured in a variety of different ways to enable the mounting apparatus to be used in a plurality of different situations and circumstances. According to still other alternative embodiments, the mounting apparatus may be used without one of more of the components described above, or it may be used in conjunction with components or elements other than those described above. For example, the mounting apparatus may not include an upper isolator, which may or may not be replaced by another component elsewhere in the suspension system.

Although the present inventions have been described with reference to exemplary and alternative embodiments, workers skilled in the art will recognize that changes may be made in form and detail without departing from the spirit and scope of the invention. For example, although different exemplary and alternative embodiments may have been described as including one or more features providing one or more benefits, it is contemplated that the described features may be interchanged with one another or alternatively be combined with one another in the described exemplary embodiments or in other alternative embodiments. Because the technology of the present invention is relatively complex, not all changes in the technology are foreseeable. The present invention described with reference to the exemplary and alternative embodiments and set forth in the following claims is manifestly intended to be as broad as possible. For example, unless specifically otherwise noted, the claims reciting a single particular element also encompass a plurality of such particular elements.

What is claimed is:

1. A mounting apparatus for use within a suspension system having a frame member, a control arm, and an elongated suspension member extending between the frame member and the control arm, the mounting apparatus comprising:
   a cup including an end that is at least partially closed, a side wall extending from the at least partially closed end, and an open end;
   a seal disposed within the cup and configured to be coupled to the elongated suspension member;
   a first resilient element at least partially disposed within the cup and substantially encapsulated by the cup and the seal; and
   a fastener configured to couple the cup, the seal, and the first resilient element between the elongated suspension member and one of the frame member and the control arm;
   wherein the first resilient element is configured to resist movement of the seal toward the at least partially closed end of the cup when a force is applied to the seal by the elongated suspension member and wherein the seal maintains the first resilient element within the open end of the cup when a force is applied to the seal.

2. The mounting apparatus of claim 1, wherein the at least partially closed end of the cup is configured to be located on a first side of the frame member.

3. The mounting apparatus of claim 2, further comprising a second resilient element configured to be located on a second side of the frame member, the second side of the frame member being opposite the first side of the frame member.

4. The mounting apparatus of claim 3, wherein the first resilient element has a first hardness and the second resilient element has a second hardness.

5. The mounting apparatus of claim 4 wherein the first hardness is approximately equal to the second hardness.

6. The mounting apparatus of claim 3, wherein the fastener is configured to couple the cup, the seal, the first resilient element, and the second resilient element to at least one of the elongated suspension member, the control arm, and the frame member.

7. The mounting apparatus of claim 6, wherein the cup, the seal, the first resilient element, and the second resilient element each include an aperture for receiving the fastener.

8. The mounting apparatus of claim 7, wherein the fastener is configured to extend through the apertures in the cup, the seal, the first resilient element, the second resilient element, and through an aperture in the frame and couple to the elongated suspension member.

9. The mounting apparatus of claim 8, further comprising a spacer configured to limit the extent to which the fastener may be coupled to the elongated suspension member.

10. The mounting apparatus of claim 9, wherein the spacer is configured to extend through the apertures in the second resilient element, the frame member, the cup, and the first resilient element, and to receive a portion of the fastener.

11. The mounting apparatus of claim 9, wherein the fastener includes a head portion and a shaft portion.

12. The mounting apparatus of claim 11, wherein the shaft portion of the fastener extends through an aperture in the spacer.

13. The mounting apparatus of claim 12, wherein the head portion of the fastener is disposed proximate the second resilient element.

14. The mounting apparatus of claim 13, wherein the spacer has a length and wherein the length of the spacer is configured to limit the distance between the head portion of the fastener and the elongated suspension member.

15. The mounting apparatus of claim 14, wherein the length of the spacer is configured so that the fastener applies a predetermined preload to at least one of the first resilient element and the second resilient element when the fastener is coupled to the elongated suspension member.

16. The mounting apparatus of claim 1, wherein a first volume is defined by the at least partially closed end of the cup, the side wall of the cup, and the seal.

17. The mounting apparatus of claim 16, wherein a portion of the first resilient element is disposed within the first volume.

18. The mounting apparatus of claim 17, wherein the portion of the first resilient element disposed within the first volume has a second volume no greater than the first volume.

19. The mounting apparatus of claim 18, wherein at least one of the first volume and the second volume is configured to decrease upon the application of a force by the elongated suspension member.

20. The mounting apparatus of claim 19, wherein the first volume and the second volume are configured to continue to decrease upon the application of successively greater forces until the first volume is equal to the second volume.

21. The mounting apparatus of claim 1, wherein the cup is metal.

22. The mounting apparatus of claim 1, wherein the seal is nylon.

23. A suspension assembly for coupling between a frame and a control arm of a suspension system, the suspension assembly comprising:
- an elongated suspension member having a first end and a second end;
- a mounting apparatus coupled to the first end of the elongated suspension member and configured to be coupled to a portion of the frame, the mounting apparatus including;
  - a cup configured to be located between the frame and the first end of the elongated suspension member, the cup having an end that is at least partially closed, a side wall extending from the at least partially closed end, and an open end;
  - a first resilient pad at least partially disposed within the cup;
  - a seal disposed within the cup so as to encapsulate the portion of the first resilient pad within the cup;
  - a second resilient pad configured to be disposed proximate the frame; and
- a fastener configured to couple to the elongated suspension member and the mounting apparatus to the frame;
- wherein the first resilient pad is configured to be compressed when a first force is applied to the mounting apparatus by the elongated suspension member and the second resilient pad is configured to be compressed when a second force is applied by the elongated suspension member.

24. The suspension assembly of claim 23, wherein the second resilient pad and the cup are disposed proximate opposite sides of the frame.

25. The suspension assembly of claim 23, wherein the seal is coupled to the first end of the elongated suspension member.

26. The suspension assembly of claim 25, wherein a first surface of the seal is flush with the first end of the elongated suspension member.

27. The suspension assembly of claim 26, wherein the first end of the elongated suspension member includes a recess.

28. The suspension assembly of claim 27, wherein the seal is disposed within the recess in the first end of the elongated suspension member.

29. The suspension assembly of claim 23, wherein the second force is different than the first force.

30. The suspension assembly of claim 29, where the second force is opposite the first force.

31. The suspension assembly of claim 23, wherein the first resilient pad has a first hardness and the second resilient pad has a second hardness.

32. The suspension assembly of claim 31, wherein the first hardness is approximately equal to the second hardness.

33. The suspension assembly of claim 23, wherein the suspension member is one of a hydraulic cylinder, a shock absorber, a strut, and a hydro-pneumatic cylinder.

34. The suspension assembly of claim 33, wherein the fastener is configured to extend through apertures in the cup, the seal, the first resilient pad, the second resilient pad, and through an aperture in the frame and couple to the elongated suspension member.

35. The suspension assembly of claim 34, further comprising a spacer configured to limit the extent to which the fastener may be coupled to the elongated suspension member.

36. The suspension assembly of claim 35, wherein the spacer is configured to extend through the apertures in the second resilient pad, the frame, the cup, the seal, and the first resilient pad, and to receive a portion of the fastener.

37. The suspension assembly of claim 36, wherein the fastener includes a head portion and a shaft portion.

38. The suspension assembly of claim 37, wherein the shaft portion of the fastener extends through an aperture in the spacer.

39. The suspension assembly of claim 38, wherein the head portion of the fastener is disposed proximate the second resilient pad.

40. The suspension assembly of claim 39, wherein the spacer has a length and wherein the length of the spacer is configured to limit the distance between the head portion of the fastener and the elongated suspension member.

41. The suspension assembly of claim 40, wherein the length of the spacer is configured so that the fastener applies a predetermined preload to at least one of the first resilient pad and the second resilient pad when the fastener is coupled to the elongated suspension member.

42. The suspension assembly of claim 23, wherein a first volume is defined by the at least partially closed end of the cup, the side wall of the cup, and the seal.

43. The suspension assembly of claim 42, wherein a portion of the first resilient pad is disposed within the first volume.

44. The suspension assembly of claim 43, wherein the portion of the first resilient pad disposed within the first volume has a second volume no greater than the first volume.

45. The suspension assembly of claim 44, wherein at least one of the first volume and the second volume is configured to decrease upon the application of a force by the elongated suspension member.

46. The suspension assembly of claim 45, Wherein the first volume and the second volume are configured to continue to decrease upon the application of successively greater forces until the first volume is equal to the second volume.

47. The suspension assembly of claim 23, wherein the cup is metal.

48. The suspension assembly of claim 23, wherein the seal is nylon.

49. A vehicle suspension system comprising:
- a frame;
- a control arm pivotally coupled to the frame;
- an elongated suspension member extending between the control arm and the frame;
- a mounting apparatus coupled to the elongated suspension member and the frame, the mounting apparatus including:
  - a cup configured to be located between the frame and the elongated suspension member, the cup having an end that is at least partially closed, a side wall extending from the at least partially closed end, and an open end facing the elongated suspension member;
  - a first resilient element at least partially disposed within the cup;
  - a seal coupled to the elongated suspension member and disposed within the cup so as to encapsulate the first resilient element;
  - a second resilient element disposed proximate the frame; and
- a fastener coupling the elongated suspension member and the mounting apparatus to the frame;
- wherein the first resilient element is compressed when a first force is applied to the mounting apparatus by the elongated suspension member and the second resilient element is compressed when a second force is applied by the elongated suspension member.

50. A method of coupling an elongated suspension member of a vehicle suspension system to a frame member of the vehicle comprising the steps of:
  placing the suspension member proximate the frame member so that a first portion of the suspension member is located on a first side of the frame member and a second portion of the suspension member is located on a second side of the frame member;
  providing a first resilient pad between the first portion of the suspension member and the first side of the frame member to resist movement of the suspension member in a first direction;
  providing a second resilient pad between the second portion of the suspension member and the second side of the frame member to resist movement of the suspension member in a second direction;
  encapsulating the first resilient pad within a chamber; and sealing the chamber;
  wherein the encapsulation of the first resilient pad within the sealed chamber limits the extent to which the suspension member can move toward the first side of the frame member in the first direction.

51. The method of claim 50, further comprising the step of preloading the first resilient pad and the second resilient pad.

52. The method of claim 51, wherein the step of preloading the first resilient pad and the second resilient pad further comprises the step of drawing the first portion of the suspension member toward the second portion of the suspension member.

53. The method of claim 52, further comprising the step of limiting the extent to which the first portion of the suspension member can be drawn toward the second portion of the suspension member.

54. The method of claim 50, wherein the first resilient pad has a first load rating and the second resilient pad has a second load rating.

55. The method of claim 54, wherein the first load rating and the second load rating are approximately equal.

* * * * *